(12) United States Patent
Tuladhar et al.

(10) Patent No.: US 10,250,036 B2
(45) Date of Patent: Apr. 2, 2019

(54) PEER-TO-PEER: AC POWER GRID COMPENSATION ARCHITECTURE

(71) Applicant: Rhombus Energy Solutions, Inc., San Diego, CA (US)

(72) Inventors: Anil Tuladhar, Canton, MI (US); Frederick Flett, Indio, CA (US)

(73) Assignee: RHOMBUS ENERGY SOLUTIONS, INC., San Diego, CA (US)

( * ) Notice: Subject to any disclaimer, the term of this patent is extended or adjusted under 35 U.S.C. 154(b) by 45 days.

(21) Appl. No.: 15/793,909

(22) Filed: Oct. 25, 2017

(65) Prior Publication Data

US 2018/0115160 A1 Apr. 26, 2018

Related U.S. Application Data

(60) Provisional application No. 62/412,663, filed on Oct. 25, 2016.

(51) Int. Cl.
*H02J 3/00* (2006.01)
*H02J 3/01* (2006.01)
(Continued)

(52) U.S. Cl.
CPC ............... *H02J 3/005* (2013.01); *H02J 3/01* (2013.01); *H02J 3/16* (2013.01); *H02J 3/26* (2013.01); *H02J 3/32* (2013.01); *H02J 3/34* (2013.01); *H02J 3/383* (2013.01); *H02J 3/386* (2013.01); *H02J 13/0017* (2013.01); *H04B 1/1018* (2013.01); *H04B 1/1027* (2013.01);
(Continued)

(58) Field of Classification Search
CPC ...... H02J 3/01; H02J 3/005; H02J 3/16; H02J 3/26; H02J 3/32; H02J 3/34; H02J 3/383; H02J 3/386; H02J 13/0017; H04B 1/1018; H04B 1/1027
See application file for complete search history.

(56) References Cited

U.S. PATENT DOCUMENTS

2017/0294782 A1* 10/2017 Navarro ................... H02J 5/00

OTHER PUBLICATIONS

Wikipedia contributors. "Peer-to-peer." Wikipedia, The Free Encyclopedia. Wikipedia, The Free Encyclopedia, Feb. 4, 2019. Web. Feb. 4, 2019. (Year: 2019).*

(Continued)

*Primary Examiner* — Daniel J Cavallari
(74) *Attorney, Agent, or Firm* — Jonathan A. Kidney; CKR Law LLP

(57) ABSTRACT

A peer-to-peer power compensation architecture for utility power systems has a "ring-pathed" power transmission supply line with legs connecting a utility power source to a utility customer load, to a secondary power source, and to the utility customer load. A sinusoidal signal is injected on the first and third legs, with a predetermined amplitude, frequency and phase characteristics, wherein at least one of the characteristics being varied as function of a voltage level and a power factor of supplied power from the respective leg. A controllable power hub with an inverter is coupled to at least the first leg and the third leg, the inverter having at least one DC or AC-based power source. The injected signal's characteristics from the respective leg are evaluated to determine if the power hub's power should be introduced to the leg to compensate for under-voltage conditions.

20 Claims, 4 Drawing Sheets

(51) Int. Cl.
*H04B 1/10* (2006.01)
*H02J 13/00* (2006.01)
*H02J 3/32* (2006.01)
*H02J 3/26* (2006.01)
*H02J 3/16* (2006.01)
*H02J 3/34* (2006.01)
*H02J 3/38* (2006.01)
*H02J 3/18* (2006.01)

(52) U.S. Cl.
CPC ............. *H02J 3/1842* (2013.01); *H02J 3/381* (2013.01); *H02J 3/382* (2013.01); *H02J 3/387* (2013.01); *Y02E 10/563* (2013.01); *Y02E 10/566* (2013.01); *Y02E 10/763* (2013.01); *Y02E 40/22* (2013.01); *Y02E 40/34* (2013.01); *Y02E 70/30* (2013.01)

(56) References Cited

OTHER PUBLICATIONS

Wikipedia contributors. "Ring network." Wikipedia, The Free Encyclopedia. Wikipedia, The Free Encyclopedia, Nov. 22, 2018. Web. Feb. 4, 2019. (Year: 2019).*

* cited by examiner

PEER-TO-PEER: AC POWER GRID COMPENSATION ARCHITECTURE

CROSS-REFERENCE TO RELATED APPLICATION(S)

This application claims the benefit of U.S. Provisional Patent Application No. 62/412,663, filed Oct. 25, 2016, the contents of which are hereby incorporated by reference in its entirety.

FIELD

This invention is related to power grid stability. More particularly, this invention is related to systems and methods for providing grid stability using, for example, peer-to-peer architecture linking various power sources.

BACKGROUND

Statistics show that on average, 87% of problems in the U.S. power grid systems are from voltage sags. Failure to sufficiently and timely compensate different grid power requirements results in brown outs or black outs. Therefore, there has been a long-standing need in the industry for systems and methods that better manage power distribution amongst various power sources, in view of varying power demands. Details of such systems and methods are elucidated below.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, a peer-to-peer power compensation architecture for utility power systems is provided, comprising: a "ring-pathed" power transmission supply line, a first leg connecting a utility power source to a utility customer load, a second leg connecting the utility power source to a secondary power source, and a third leg connecting the secondary power source to the utility customer load; an injected sinusoidal signal traveling on the first and third legs, the injected signal having a predetermined amplitude, frequency and phase characteristics, wherein at least one of the characteristics being varied as function of a voltage level and a power factor of supplied power from the respective leg; and at least one controllable power hub having an inverter, coupled to at least the first leg and the third leg, the inverter having at least one DC or AC-based power source, wherein the injected signal's characteristics from the respective leg are evaluated to determine if the power hub's power should be introduced to the leg to compensate for an under-voltage condition.

In other aspects of the disclosed embodiments, the above system is provided wherein the inverter's power source is at least one of a solar power, wind power system, and DC power storage system; and/or wherein the secondary power source is comprised of at least one of a solar panel, battery, fuel cell, wind, and turbine system; and/or wherein the DC power storage system is tapped to provide power into the supply line; and/or wherein the injected signal has a base frequency ranging between 30 Hz to 500 Hz; and/or wherein the injected signal has a different frequency depending on which leg is it injected into; and/or further comprising a predictive digital filter, implemented upon the injected signal's characteristics to reduce white noise; and/or wherein the predictive filter is used to eliminate harmonics.

In yet another aspect of the disclosed embodiments, a peer-to-peer power compensation method for utility power systems is provided, comprising: injecting sinusoidal signals onto a multi-legged, "ring-bus" power supply line connecting a utility power source to a utility customer load, connecting the utility power source to a secondary power source, and connecting the secondary power source to the utility customer load; varying a predetermined amplitude, frequency and phase characteristic of each of the injected signals as a function of a voltage level and a power factor of supplied power from a respective leg; and evaluating each injected signal's characteristics from the respective leg and determining to introduce a controllable power hub to the respective leg to compensate for an under-voltage condition.

In other aspects of the disclosed embodiments, the above method is provided, wherein a total power the injected signal at a selected leg is a sum of all the powers of each non-selected injected signal leg; and/or wherein an islanding situation is determined from the injected signal's characteristics; and/or wherein the evaluating step determines that a controllable power hub should be dropped from the respective leg; and/or wherein the evaluating step determines that an additional controllable power hub should introduced to the leg; and/or further comprising reducing white noise and harmonics using a predictive filter; and/or further comprising, increasing a signal-to-noise ratio of the injected signal by adjusting a voltage amplitude of the injected signal adaptively based on noise level and line impedances; and/or further comprising, increasing a control range by adaptively adjusting either the injected signal's voltage amplitude, or frequency or phase angle; and/or further comprising, using white noise cancellation techniques to improve signal-to-noise ratio through adaptive control techniques; and/or further comprising, using average frequency and phase measurements to improve signal detection through adaptive phase loop lock (PLL) techniques; and/or further comprising, further comprising using an adaptive filter to cancel out second, or third or fifth line harmonics; and/or further comprising, peer signal hopping to average out a quantity to be shared by adjusting the injected signal's frequency as a function of the quantity being shared.

DETAILED DESCRIPTION

Glossary

Figure 1:
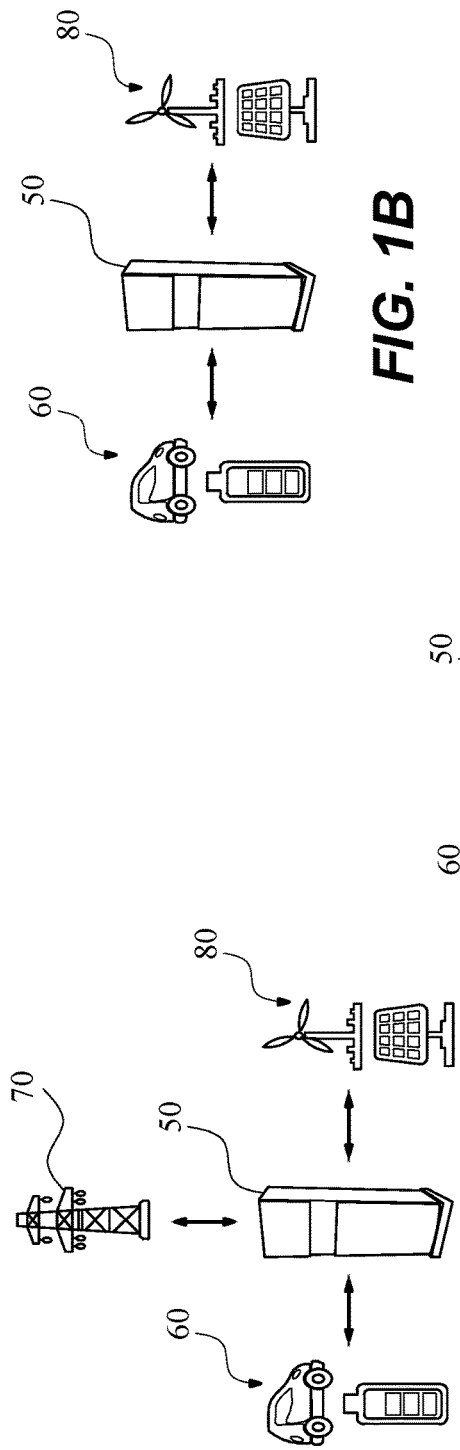
FIG. 1A illustrates a power converter connected to various power assets and power grid.
FIG. 1B illustrates power converter connected only to a battery and solar (and/or wind power) assets.
FIG. 1C illustrates power converter connected to storage/battery power asset and to solar (and/or wind) power assets and also to a load.

Voltage Sag—A voltage sag (U.S. English) or voltage dip (British English) is a short duration reduction in RMS voltage.

Brownout—A brownout is a drop in voltage in an electrical power supply system. The reduction lasts for minutes or hours (as opposed to short-term voltage sage or dip).

Power-Hub—A combination of renewable energy sources and power conversion apparatus such as a power inverter.

Microgrids—A microgrid is a small energy system capable of balancing captive supply and demand resources to maintain stable service within a defined boundary.

Balancing—Active efforts to match energy supply and demand to maintain stable system operations. Both microgrids and large-scale utility grids perform balancing operations.

INTRODUCTION

Recent work from Lawrence Berkeley National Labs (LBNL) identifies that the stability of the electricity grid supply has been getting worse in the U.S. over time. The five-year annual average of outages doubled every five years, which means the current five-year annual average is four times what it was fifteen years ago. In the first six months of 2014, there were 130 reported grid outages— which puts that six month period as having more outages than all but four years since 2000.

Comparing 2000 to 2013, the monthly average grid outages increased six-fold: In 2000, there were an average of 2.5 grid disruption events a month. In 2013, there were an average of 14.5 disruption events a month. In the first half of 2014, there were 21.7 events a month. In 2011, the year with the most reported outages, there were an average 25.6 reported events each month. The U.S. Department of Energy (DOE) reported that US businesses are losing up to $150 billion per year, due to grid outages with weather-related disruptions costing the most per event.

Example problems caused by brown outs and voltages sags, are
  Active data loss
  System lockups
  Lost productivity
  Slow electronic degradation There is, however, another significant factor that deserves promotion in the list above. This refers to the effect of voltage sags related to electric motor loads. According to the DOE, electric motors consume more 50 percent of all electrical energy in the United States and more than 85 percent of industrial production electrical energy. Electric motors account for roughly $85 out of every $100 of a manufacturing/process plant's electrical bill.

The effect of voltage sags at the point of electric motor loads changes the load characteristics of the electricity that supplies the electric motor. Here, the effect of lagging power factor is increased which in direct consequence necessitates more applied voltage to handle the mechanical load applied to the electric motor. This has a snowball effect that may either degrade the electric motor due to excessive heating, and certainly causes increased stress on the grid electricity supply. Here, what may have started as a voltage sag could in all likelihood turn into a brownout, or even a rolling blackout.

Rather than rely on a one-size fit all approach where a central system manages a suite of distributed multi-tier (usually large-scale power production facilities—gas, nuclear, hydro, etc.) across multiple service regions, a de-centralized approach is described in this disclosure, using for example peer-to-peer microgrids to address local or region specific or even distant-grid needs. For example, it is understood that power assets can come from various origins, from storage sources (e.g., battery, reservoirs, back-up systems, etc.), environmental-dependent sources (e.g., wind, solar, etc.), "full-time" resources (gas, oil, coal, nuclear plants), as well as from customer- or alternate-generated sources (roof solar panels, farm windmills, etc.), and so forth.

With the proliferation of "local" or region-based off-grid power sources, such as solar panels, windmills, storage systems and so-forth, there is a great opportunity to integrate these off-grid assets into the grid. For effectiveness, all of these resources must be managed that avoids complexity and provides a sufficient degree of robustness against voltage sags. However, these private or off-grid sources often have limited communication/control capabilities causing their "system-level" integration to be unreliable. Further, as loading can vary rapidly from region to region, management and interplay between the available assets (some which are very distant from the load demanding area) can become exceedingly complicated and further add difficulty to the situation. Attempts have been made to integrate such off-grid systems into a power grid or to a demand region, but as alluded above have been generally unsuccessful because of ineffectiveness of "communication" between the diverse systems.

Overview

In view of the above, a reliable and efficient method of supporting the electricity grid is now discussed using an arrangement of grid-tie hubs of renewable energy and power conversion assets. A peer-to-peer power conversion architecture is described to manage "local" or demand areas and the various assets at hand. The de-decentralization allows for flexibility in determining which asset to bring to the demand area. Thus, as load requirements vary, more or less assets can be brought into the demand area or even dropped from the demand area. "Balancing" of the connected assets is performed using a sinusoidal signal (either as a single signal or a combination of signals) in the power transmission network to share a certain quantity (any desired quantity can be utilized) among the distributed assets without a need of control interconnections. The same signal circulates among the assets, each one nudging the frequency of the signal a little bit based on the quantity to be shared. Eventually the frequency of the signal settles, which ensures proper sharing of the quantity among all assets. Another analogy can be like passing a ball among players, each one applying a force on the ball proportional to the quantity to be shared. The speed of ball keeps changing until all the players share the quantity equally because the ball will eventually have to assume a single velocity (frequency) in steady state.

Unlike conventional power line carrier communication, the injected signal does not need to be a high frequency so it will not get attenuated or overloaded. For example, a "lower" frequency range of 30 Hz to 500 Hz could be used. For each quantity to be shared among multiple assets, only one signal is sufficient (though multiple signals could be used).

FIGS. 1A-C are illustrations of various embodiments of a peer-to-peer power conversion architecture, offering advantages over convention master-slave systems. In particular, the need for a master controller, or a common synchronization between power conversion stages is eliminated, thus reducing the effect of a single point of failure. In concert with this increase in redundancy, the architecture hosts the ability to parallel power converters of different power levels while maintaining equal load sharing. By applying an adaptive pre-programmed compensation factor to each power inverter, this architecture resembles, and performs like a variable solid-state synchronous generator.

For example, FIG. 1A illustrates a power converter 50 connected to storage/battery power asset (or load) 60 and to solar and/or wind power asset 80 and also to grid 70. The power converter 50 manages the input DC sources and converts it for use by the grid 70

FIG. 1B illustrates power converter 50 connected only to battery (now acting as a "load") 60 and solar and/or wind power asset 80. Here, it is presumed the asset 80 is used to charge the battery 60, while the system is disconnected from the grid.

FIG. 1C illustrates power converter 50 connected to storage/battery power asset (or load) 60 and to solar and/or wind power asset 80 and also to load 90. Here, the exemplary system operates independently from the grid and provide "local" power to load 90.

It should be understood the interconnections between the various assets and loads shown in FIGS. 1A-C may be fixed or switchable and also the assets may not be necessarily "local." Also, intrinsic to the power converter 50 would be a controller or computer (not shown), managing the operation of the power converter 50 and possibly the tie-in characteristics including any signaling information. In some embodiments, the controller may be separate from the power converter 50 and may even be in a remote location from the power converter 50.

Figure 2:
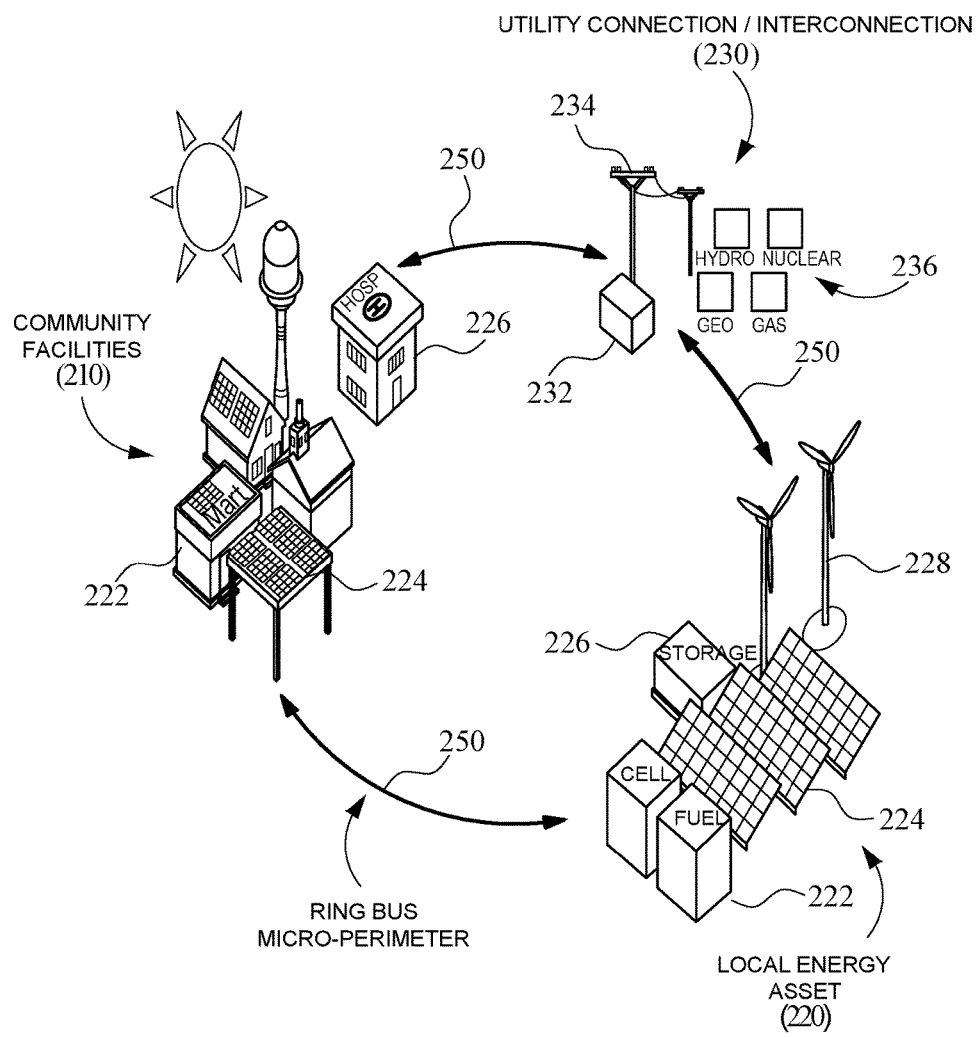
FIG. 2 is a pictorial illustration of an exemplary "community" microgrid control system.

FIG. 2 is a pictorial illustration 200 of an exemplary "community" microgrid control system. Ring-bus 250 connects each asset/load to form a micro-perimeter. For example, Community Facilities 210 may have loads 222, 226 as well as assets 224; Local Energy Assets 220 may have a plurality of available power sources, such as battery/fuel cells 22, solar panels 224, storage capabilities 226, wind turbines 228, water turbines, etc.; and, the Utility Connection/Interconnection 230 will have a substation or grid-tap in 232 connected via transmission line(s) 234 to one or more large scale power assets 236. The Ring-bus 250 is common to all the assets and loads so power and/or communication is shared.

The distributed nature of the peer-to-peer architecture has significance with regard to the achievement of balancing the various load sharing associated with the various power generation assets. Specifically, real and reactive load sharing is highly significant in Microgrid distributed power generation. Individual power inverters can address load sharing and act autonomously without recall to a master controller. This technique is more robust and will minimize the response time to step-load functions, or grid line sags. It also highlights the redundant nature of the peer-to-peer architecture.

Figure 3:
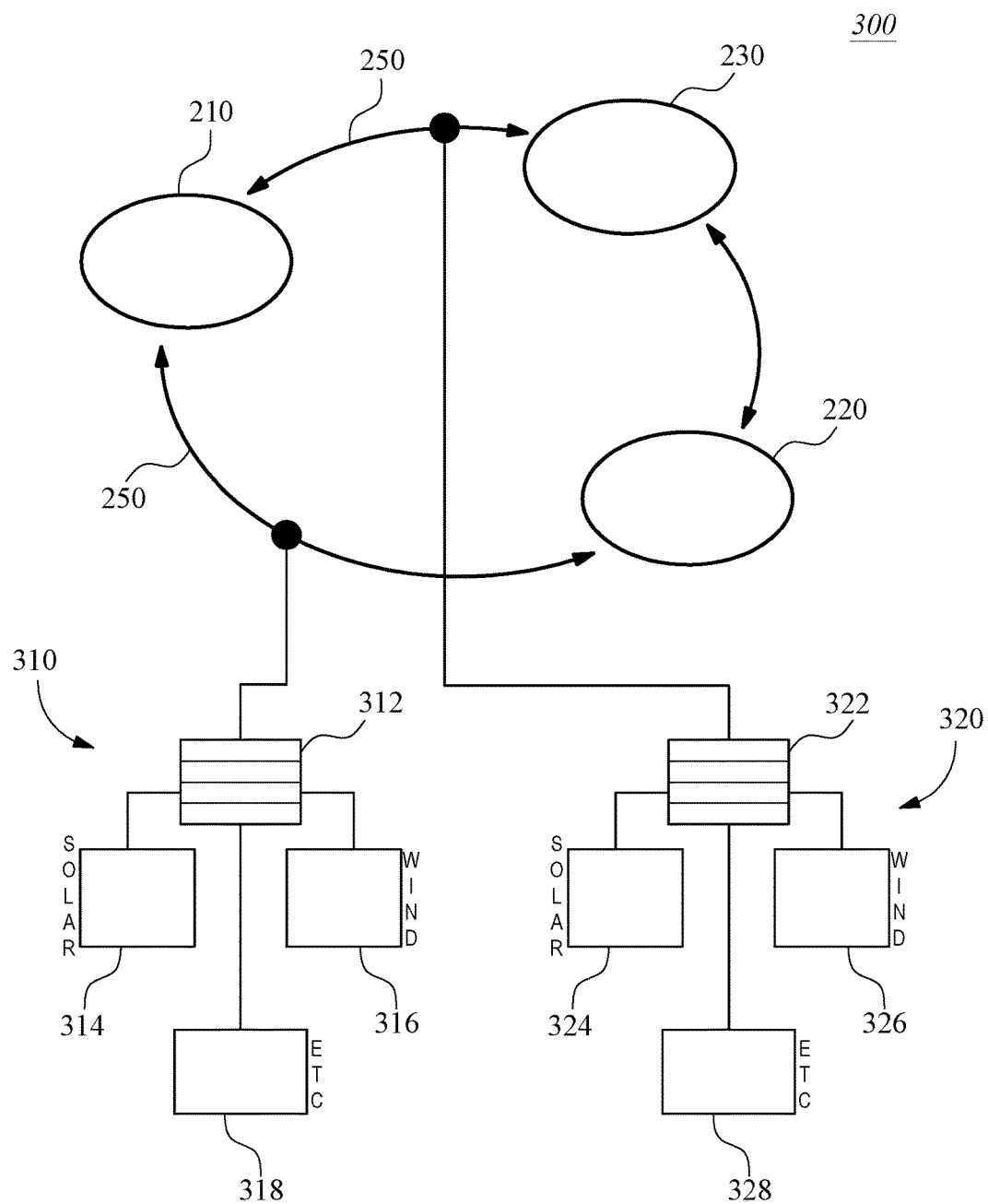
FIG. 3 is an illustration showing an implementation of the exemplary peer-to-peer architecture using microgrid power hubs tied to a ring bus.

FIG. 3 is an illustration 300 showing an implementation of the exemplary peer-to-peer architecture as microgrid power hubs tied to the ring bus with, for example, the power assets of FIGS. 1 & 2. Power inverters 312 and 322 convert DC power from secondary solar/wind/etc. assets (314, 316, 318 and 322, 326, 328, respectively) and are set in "parallel" being separately connected to AC power lines 250 from Utility Connection/Interconnection 230 and Local Energy Assets 220. While FIG. 3 shows two separate Power hubs (inverters and associated sources) attached to the AC power lines 250, more or less Power hubs may be implemented. It is also noted that a given Power hub may be controllably connected or disconnected. Further, the Power hubs may supply power from an AC generating source. The AC power lines connections 250 are used to determine both real and reactive impedance for each Power inverter 312, 322, using a sequence of signal injection techniques. A simplified description of the signal injection technique is as follows.

A disturbance frequency is injected into the AC power lines 250 (by any one of the systems/sub-systems) to indicate a phase shift whereupon the real power is measured. (The frequency of the disturbance frequency reflects the amount of variation or phase shift needed for equilibrium and will vary accordingly.) This real power is then used as a function of applied voltage to calculate the reactive power seen by each Power inverter 312, 322. These measurements or parameters are used to compensate for unit-to-unit variation. Control over these parameters determines the ratio of power that each Power inverter 312, 322 can share the load, allowing Power inverters of different sizes to be used in the peer-to-peer architecture.

In the event that a Power hub has a combination of solar and wind power (for example, 314, 316 and/or 324, 326) being fed to a Power inverter (312, 322), and dependent upon solar irradiation and wind conditions, the appropriate Power hub can be arbitrated for selection via a software algorithm to compensate for a grid droop or brown out. The software algorithm may be resident on a computer or controller (not shown) in the Power inverters 312, 322 or at another desired location.

The exemplary configuration prevents AC grid line disturbances when microgrid power is applied to the grid electricity supply. Conversely, the grid impedance and stability measurement factors into the dynamic control of balancing Power inverters in the amalgam of microgrid power sources.

For example, if the pre-programmed line sag compensation level is exceeded for one Power inverter in a Power hub, other Power inverters (or hubs) may be brought on-line to add compensation. Conversely as the effect of the droop diminishes, power conversion/inverter units can be dropped from grid connectivity to increase the transfer efficiency from the remaining Power hubs. This application of compensatory voltage mode transition is seamless in its interaction with the electricity grid supply. Thus, "tiering" or "staging" of secondary systems can be utilized in an intelligent manner, in accordance with metrics determined from the distributed disturbance frequency. Also, maintenance and serviceability of Power Inverters on the ring bus can also be carried out without taking the total system of Power Inverters off-line. Further, conventional master-slave configurations and their associated short-comings are obviated by this process.

It is noteworthy to discuss various other methods in the context of this disclosure. Other methods rely on measuring the small real power flow due to this injected signal locally and adjusts the quantity to be shared based on this real power. Here, the term quantity can refer to either real power, or reactive power, or DC current, or Total Harmonic Distortion (THD). This method is sufficient if the impedance imbalances between the sources are not too high and the noise level on the system is lower. However, it becomes challenging at high power network where the noise level is significant and the line impedance imbalances could also be much higher. In contrast, the exemplary method described herein is suitable for both low and high noise systems as well as for high line impedances.

Figure 4:
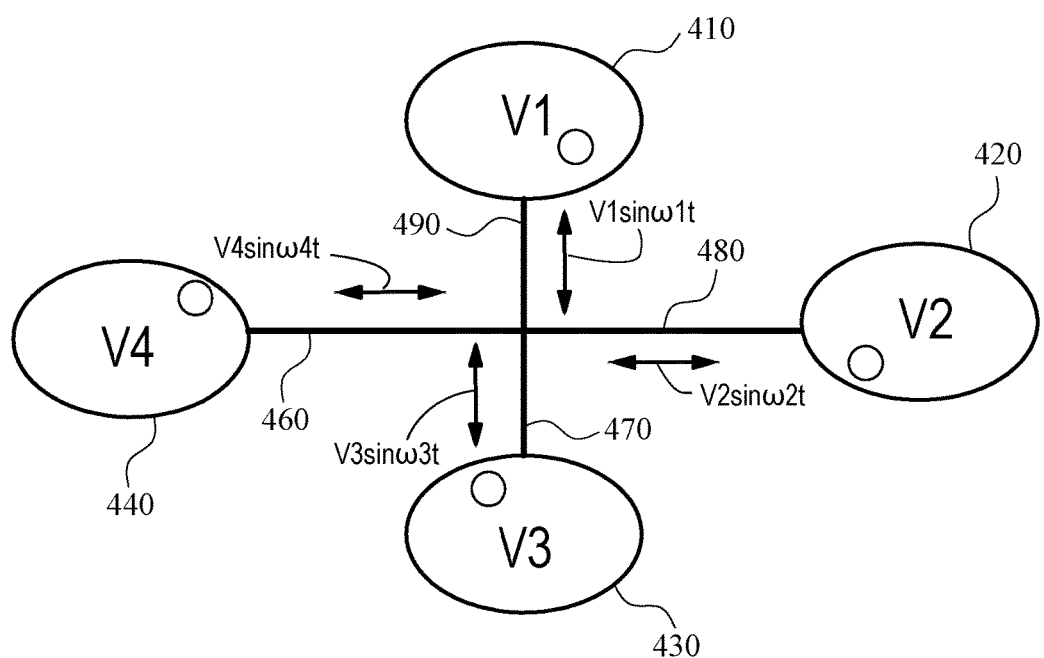
FIG. 4 is a block illustration showing a network of four sources with different lengths of line, and in-line injected signals for phase signaling.

FIG. 4 is a block illustration 400 showing a network of four sources V1, V2, V3, V4 (410, 420, 430, 440) with different lengths of line 460, 470, 480, 490 (having different line impedances). The exemplary signal injection method injects a sinusoidal signal (ω1-2-3-4-t) into the network, which can be continuously adjusted either in its frequency and/or phase to reflect the average quantity to be shared among network members. As alluded above, this approach does not require dedicated control/communication interconnections, but "piggy backs" on the pre-existing power line connections.

Specifically, each source V1, V2, V3, V4 (410, 420, 430, 410, respectively) injects a small signal f1, f2, f3, f4 (of different amplitude and/or frequency) to the network in "real time" or approximately real time. Depending upon the line impedance encountered, the resulting real power flow due to these signals will be given by the following equations:

$$P12=V1*V2\ \sin(integral(f1-f2)dt))/\times 12$$

$$P13=V1*V3\ \sin(integral(f1-f3)dt))/\times 13$$

$$P14=V1*V4\ \sin(integral(f1-f4)dt))/\times 14,$$

where P12 is the power between sources V1 and V2 (410 and 420), P13 the power between sources V1 and V3 (410 and 430), and P14 the power between sources V1 and V4 (410 and 440). And x12, x13, x14 are the respective line impedances. Total real power output from source V1 (410) will be given by the superposition of these three "small" powers from the injected signal:

$$P1=P12+P13+P14$$

It should be evident from the equations that the real power is a sinusoidal function, which is highly nonlinear. If the impedance increases, the amplitude of power will decrease and the linear range for power versus angle will reduce. For high impedance situations, the linear range will be exceeding small. This poses practical challenges.

However, adjusting the amplitude of the injected voltage and frequency or phase adaptively will help circumvent this issue and expand the linear range. Accordingly, the linear region can be extended by detecting, for example, the average injected signal frequency of the network, and then adjusting the voltage amplitude and/or frequency and/or phase angle. A phase loop lock (PLL) can measure the average frequency as well as the phase angle for the purposes stated. Correlating the instantaneous average frequency of the network against injected signal frequency gives rise to phase angle information, which changes as a function of time. In other words, the difference in frequencies of the injected signals from different sources give rise to a frequency error and the phase difference arises from the integration of this frequency error over time.

The integration process accumulates the values over time. As an example, as the distance between two cars going at slightly difference speeds continue to grow, the difference of frequency between the sources will also accumulate over time to give an ever increasing phase error indication.

If this phase angle exceeds around 30 degrees, real power flow will become a significantly nonlinear function of the phase angle. However, increasing the amplitude of the injected signal increases the power level for the same angle error which enhances the signal to noise ratio making it more noise immune. Better signal to noise ratio makes the detection easier which enhances linear range for the same power level for lower phase angle (which also helps in stabilizing the controller). Adaptive adjustments can be made based on noise level and line impedances.

As shown in the equations above, the real power flow depends upon the square of the voltage amplitude, which helps extend the linear region very rapidly. Information on average frequency can also predict the phase angle to further improve the stability. Adjustment of frequency to keep the phase angle within the stability region is also possible. Since noise in the system will mostly be white, a predictive filter and/or adaptive control techniques can be used to reduce the noise effect. Predictive filters can also eliminate the effect of known harmonics in the system such as second harmonics or third harmonics or fifth harmonics.

Understanding the principles presented, the control range can be increased by adaptively adjusting either the injected signal's voltage amplitude, or frequency or phase angle. Due to the injected signal having a known frequency, average frequency and phase measurements can be implemented to improve signal detection, for example, through adaptive phase loop lock (PLL) techniques. Further, peer signal hopping can be utilized to average out a "quantity" to be shared, for example, by adjusting the injected signal's frequency as a function of the quantity being shared.

Mathematical examples of a signal exchange paradigm using power inverters are presented in a publication by the instant inventors and Hua J., Unger T., and Mauch K., titled "Control of Parallel Inverters in Distributed AC Power Systems with Considerations of Line Impedance Effect," IEEE Transactions on Industrial Applications, Vol. 36, No. 1, pp 131-138, January/February 2000, the teachings therein being incorporated herein by reference.

In view of the above signaling technique in a Power hub or peer-to-peer configuration, dependent upon the renewable power sources available, the applied compensation from a Power hub can correct the power factor instability by applying a combination of real and reactive power compensation. This is particularly relevant when the power factor shift may have been caused by the increase in inductive load power due to the voltage droop that may be time displaced from the brown-out event.

There may also be the situation where several satellite clusters of renewable energy hubs are displaced in distance relative to the primary event of grid brown-outs. Here, data (e.g., derived from the injected signal parameters) can be feed-forwarded to other satellite units and thereby prepare units to arrive at the forecast compensation power ratio needed to avoid brown-outs. Thus, changes in both real and reactive AC grid measurements may be used to prepare Power hubs and their individual droop compensation parameters for forthcoming line sags.

Electric vehicle battery charging and discharging is also accommodated by the peer-to-peer architecture through load leveling. In this instance, the power needed to charge a fleet of electric vehicles may fluctuate throughout the day and can be compensated by Power hubs. Conversely the discharge power capability from the electric vehicles may be harnessed to support the renewable energy sources in periods of voltage sags. As the opportunity time to use the battery discharge from electric vehicles to support grid sags may be variable, the addition of a rechargeable storage source can be added to the renewable energy sources. This auxiliary power source may also receive charging power from renewable sources, if required. By using only the amount of power required for charging purposes, the Power hubs may alternate their duty in supplying energy to the auxiliary storage source, thereby increasing the efficiency of the energy transfer.

Another power problem is in islanding. Islanding is a condition where distributed generation sources continue to supply power to the grid when the electric grid power is no longer present. This is both a safety hazard to utility workers and can be problematic upon grid reconnection when grid power returns. Power inverters are now mandated to include Anti-Islanding features, to avoid this occurrence. IEEE 1547 includes anti-islanding standards to protect the safety of utility line workers. However, there are instances where the anti-islanding techniques are vulnerable to false positives, or fail to detect islanding when the distributed energy source equals the grid supply at the time of disconnect.

The detection of both these above occurrences can be increased in robustness through the grid measurement techniques used by the peer-to-peer distributed architecture. For example, the measurement of grid impedance by individual inverters to arrive at the appropriate balanced condition for compensation can also be used to detect changes such as islanding. Time stamped comparisons of real and reactive measurements between paralleled inverters can increase the robustness of both detecting false positives and actual islanding events.

Many modifications and variations can be made to the systems and methods described above, without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. It is to be understood that this disclosure is not limited to particular methods, implementations, and realizations, which can, of course, vary. It is also to be understood that the terminology used herein is for the purpose of describing particular embodiments only, and is not intended to be limiting.

As will be appreciated by one skilled in the art, the present disclosure's algorithm may be implemented into an apparatus that incorporates some software components. Accordingly, some embodiments of the present disclosure, or portions thereof, may combine one or more hardware components such as microprocessors, microcontrollers, or digital sequential logic, etc., such as processor with one or more software components (e.g., program code, firmware, resident software, micro-code, etc.) stored in a tangible computer-readable memory device such as a tangible computer memory device, that in combination form a specifically configured apparatus that performs the functions as described herein. These combinations that form specially-programmed devices may be generally referred to herein "modules". The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, and the like. A given module may even be implemented such that the described functions are performed by separate processors and/or computing hardware platforms.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A peer-to-peer power compensation architecture for utility power systems, comprising:
    a "ring-pathed" power transmission supply line, a first leg connecting a utility power source to a utility customer load, a second leg connecting the utility power source to a secondary power source, and a third leg connecting the secondary power source to the utility customer load;
    an injected sinusoidal signal traveling on the first and third legs, the injected signal having a predetermined amplitude, frequency and phase characteristics, wherein at least one of the characteristics being varied as function of a voltage level and a power factor of supplied power from the respective leg; and
    at least one controllable power hub having an inverter, coupled to at least the first leg and the third leg, the inverter having at least one DC or AC-based power source, wherein the injected signal's characteristics from the respective leg are evaluated to determine if the power hub's power should be introduced to the leg to compensate for an under-voltage condition.

2. The peer-to-peer power compensation architecture of claim 1, wherein the inverter's power source is at least one of a solar power, wind power system, and DC power storage system.

3. The peer-to-peer power compensation architecture of claim 1, wherein the secondary power source is comprised of at least one of a solar panel, battery, fuel cell, wind, and turbine system.

4. The peer-to-peer power compensation architecture of claim 2, wherein the DC power storage system is tapped to provide power into the supply line.

5. The peer-to-peer power compensation architecture of claim 1, wherein the injected signal has a base frequency ranging between 30 Hz to 500 Hz.

6. The peer-to-peer power compensation architecture of claim 1, wherein the injected signal has a different frequency depending on which leg is it injected into.

7. The peer-to-peer power compensation architecture of claim 1, further comprising a predictive digital filter, implemented upon the injected signal's characteristics to reduce white noise.

8. The peer-to-peer power compensation architecture of claim 1, wherein the predictive filter is used to eliminate harmonics.

9. A peer-to-peer power compensation method for utility power systems, comprising:
    injecting sinusoidal signals onto a multi-legged, "ring-bus" power supply line connecting a utility power source to a utility customer load, connecting the utility power source to a secondary power source, and connecting the secondary power source to the utility customer load;
    varying a predetermined amplitude, frequency and phase characteristic of each of the injected signals as a function of a voltage level and a power factor of supplied power from a respective leg; and
    evaluating each injected signal's characteristics from the respective leg and determining to introduce a controllable power hub to the respective leg to compensate for an under-voltage condition.

10. The peer-to-peer power compensation method of claim 9, wherein a total power the injected signal at a selected leg is a sum of all the powers of each non-selected injected signal leg.

11. The peer-to-peer power compensation method of claim 9, wherein an islanding situation is determined from the injected signal's characteristics.

12. The peer-to-peer power compensation method of claim 9, wherein the evaluating step determines that a controllable power hub should be dropped from the respective leg.

13. The peer-to-peer power compensation method of claim 9, wherein the evaluating step determines that an additional controllable power hub should introduced to the respective leg.

14. The peer-to-peer power compensation method of claim 9, further comprising reducing white noise and harmonics using a predictive filter.

15. The peer-to-peer power compensation method of claim 9, further comprising, increasing a signal-to-noise ratio of the injected signal by adjusting a voltage amplitude of the injected signal adaptively based on noise level and line impedances.

16. The peer-to-peer power compensation method of claim 9, further comprising, increasing a control range by adaptively adjusting either the injected signal's voltage amplitude, or frequency or phase angle.

17. The peer-to-peer power compensation method of claim 9, further comprising, using white noise cancellation techniques to improve signal-to-noise ratio through adaptive control techniques.

18. The peer-to-peer power compensation method of claim 9, further comprising, using average frequency and phase measurements to improve signal detection through adaptive phase loop lock (PLL) techniques.

19. The peer-to-peer power compensation method of claim 9, further comprising, further comprising using an adaptive filter to cancel out second, or third or fifth line harmonics.

20. The peer-to-peer power compensation method of claim 9, further comprising, peer signal hopping to average out a quantity to be shared by adjusting the injected signal's frequency as a function of the quantity being shared.

* * * * *